United States Patent
Al Ghamdi et al.

(10) Patent No.: US 12,196,505 B2
(45) Date of Patent: Jan. 14, 2025

(54) ECOLOGICAL SYSTEM FOR COOLING TOWERS ALGAE CONTROL

(71) Applicant: SAUDI ARABIAN OIL COMPANY, Dhahran (SA)

(72) Inventors: Khalid Hamed Al Ghamdi, Dhahran (SA); Abdulraheem Mohammad Al Arfaj, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 500 days.

(21) Appl. No.: 17/644,596

(22) Filed: Dec. 16, 2021

(65) Prior Publication Data

US 2023/0194194 A1    Jun. 22, 2023

(51) Int. Cl.
| | |
|---|---|
| F28F 19/00 | (2006.01) |
| C02F 1/00 | (2023.01) |
| C02F 1/50 | (2023.01) |
| C02F 103/02 | (2006.01) |
| F28F 25/00 | (2006.01) |

(52) U.S. Cl.
CPC .............. *F28F 19/00* (2013.01); *C02F 1/008* (2013.01); *C02F 1/50* (2013.01); *C02F 2103/023* (2013.01); *C02F 2201/005* (2013.01); *C02F 2209/005* (2013.01); *C02F 2301/046* (2013.01); *C02F 2303/04* (2013.01); *F28F 2025/005* (2013.01); *F28F 2265/20* (2013.01)

(58) Field of Classification Search
None
See application file for complete search history.

(56) References Cited

U.S. PATENT DOCUMENTS

| | | | | |
|---|---|---|---|---|
| 2,891,574 | A * | 6/1959 | Dahlberg ................ | F28F 25/02 137/577 |
| 3,361,150 | A * | 1/1968 | Horner .................... | F22B 21/06 324/438 |
| 3,592,212 | A * | 7/1971 | Schleimer .............. | G05D 21/02 324/438 |
| 3,598,372 | A * | 8/1971 | Schneider, Jr. ......... | C02F 1/688 261/50.1 |
| 3,627,032 | A * | 12/1971 | Glad ....................... | C02F 1/685 165/104.31 |

(Continued)

FOREIGN PATENT DOCUMENTS

| | | |
|---|---|---|
| CN | 104528931 B | 6/2016 |
| EP | 1647527 A1 | 4/2006 |
| WO | 2007/114528 A1 | 10/2007 |

OTHER PUBLICATIONS

Ball, Andrew S. et al., "Algal growth control by a barley straw extract", Bioresource Technology, vol. 77, Iss. 2, pp. 177-181, 2001 (5 pages).

(Continued)

*Primary Examiner* — Robert J Popovics
(74) *Attorney, Agent, or Firm* — Osha Bergman Watanabe & Burton LLP

(57) ABSTRACT

A system includes a cooling tower, an algae inhibitor skid, and at least one pump fluidly connected between the cooling tower and the algae inhibitor skid. The algae inhibitor skid includes a first water tank containing a first water supply fluidly connected to the cooling tower and barley straw suspended within the first water tank above the first water supply.

8 Claims, 5 Drawing Sheets

(56) References Cited

U.S. PATENT DOCUMENTS

| | | | | |
|---|---|---|---|---|
| 3,628,663 A * | 12/1971 | Derham | F28F 25/00 | 210/278 |
| 3,788,340 A * | 1/1974 | O'Leary | G05D 21/02 | 137/101.25 |
| 4,018,592 A * | 4/1977 | Buckman | C08G 73/0226 | 504/160 |
| 4,172,786 A * | 10/1979 | Frosch | C02F 1/78 | 422/9 |
| 4,306,967 A * | 12/1981 | Trautwein | B03B 9/061 | 210/260 |
| 4,464,315 A * | 8/1984 | O'Leary | G05D 21/02 | 137/5 |
| 4,475,356 A * | 10/1984 | Lewis | F28F 27/003 | 261/DIG. 11 |
| 4,532,045 A * | 7/1985 | Littmann | F28F 19/00 | 210/295 |
| 4,610,783 A * | 9/1986 | Hudson | C02F 1/505 | 210/446 |
| 4,836,239 A * | 6/1989 | Kinkead | G05D 9/12 | 261/109 |
| 4,931,187 A * | 6/1990 | Derham | C02F 5/02 | 700/282 |
| 5,145,585 A * | 9/1992 | Coke | C02F 1/385 | 261/DIG. 11 |
| 5,211,855 A * | 5/1993 | Antelman | C02F 1/505 | 210/764 |
| 5,213,694 A * | 5/1993 | Craig | C02F 1/686 | 261/DIG. 11 |
| 5,268,092 A * | 12/1993 | Eden | C02F 1/008 | 210/764 |
| 5,300,225 A * | 4/1994 | Fischer | B01D 33/503 | 210/402 |
| 5,332,494 A * | 7/1994 | Eden | C02F 1/686 | 324/438 |
| 5,342,510 A * | 8/1994 | Eden | G05D 21/02 | 324/438 |
| 5,424,032 A * | 6/1995 | Christensen | C02F 9/00 | 422/24 |
| 5,468,377 A * | 11/1995 | Clavin | C02F 1/76 | 210/167.3 |
| 5,525,241 A * | 6/1996 | Clavin | C02F 1/688 | 210/764 |
| 5,527,462 A * | 6/1996 | Davis | B01D 29/6484 | 210/414 |
| 5,552,058 A * | 9/1996 | Fanning | B01D 53/8659 | 210/806 |
| 5,611,933 A * | 3/1997 | Cleveland | B01F 23/12 | 210/167.3 |
| 5,622,632 A * | 4/1997 | Gallup | B01D 53/002 | 210/669 |
| 5,858,219 A * | 1/1999 | Kusmierz | C02F 1/4606 | 210/275 |
| 5,879,565 A * | 3/1999 | Kusmierz | C02F 1/4602 | 210/765 |
| 6,149,929 A * | 11/2000 | Friedman | A01N 63/20 | 435/243 |
| 6,274,054 B1 * | 8/2001 | Murphy, Jr. | C02F 1/505 | 210/764 |
| 6,596,160 B2 * | 7/2003 | Lee | C02F 1/78 | 210/275 |
| 6,716,340 B2 * | 4/2004 | Meyer | C02F 1/78 | 210/194 |
| 6,733,654 B1 * | 5/2004 | Itzhak | F28F 25/00 | 205/742 |
| 6,887,389 B2 * | 5/2005 | Judd | C02F 11/10 | 210/768 |
| 7,223,337 B1 * | 5/2007 | Franzino | B08B 9/08 | 210/241 |
| 7,252,801 B2 * | 8/2007 | Coffey | F28F 25/00 | 210/764 |
| 7,261,285 B2 * | 8/2007 | Kienbock | F28F 21/06 | 261/DIG. 11 |
| 7,282,156 B2 * | 10/2007 | Franzino | F28F 25/00 | 210/241 |
| 7,497,953 B2 * | 3/2009 | Dart | C02F 1/766 | 210/764 |
| 7,802,774 B2 * | 9/2010 | Facius | F28F 25/04 | 261/DIG. 11 |
| 8,088,287 B2 * | 1/2012 | Dart | C02F 5/02 | 210/764 |
| 8,223,495 B1 * | 7/2012 | Carlson | F28B 9/06 | 361/752 |
| 8,287,732 B2 * | 10/2012 | Chen | C12M 29/02 | 210/603 |
| 8,476,196 B2 * | 7/2013 | Paul, III | A01N 59/00 | 504/151 |
| 8,506,797 B2 * | 8/2013 | Niazi | B01F 27/9212 | 436/86 |
| 8,553,416 B1 * | 10/2013 | Carlson | F24S 10/30 | 361/699 |
| 8,617,315 B2 * | 12/2013 | Mantelatto | C13B 10/12 | 71/11 |
| 8,668,886 B2 * | 3/2014 | Niazi | C12Q 3/00 | 422/50 |
| 9,062,471 B2 * | 6/2015 | Fischmann | E04H 4/1281 | |
| 9,334,518 B2 * | 5/2016 | Medoff | C07C 29/149 | |
| 9,347,303 B2 * | 5/2016 | Horst | F02B 65/00 | |
| 9,464,334 B2 * | 10/2016 | Medoff | C12P 7/52 | |
| 9,491,892 B1 * | 11/2016 | Carlson | F28D 15/00 | |
| 9,540,250 B2 * | 1/2017 | Schubert | B01D 5/0057 | |
| 9,926,212 B2 * | 3/2018 | Davie | B01D 61/18 | |
| 10,083,767 B2 * | 9/2018 | Smith | F28F 19/00 | |
| 10,144,656 B2 * | 12/2018 | Kimball | C02F 3/348 | |
| 10,752,528 B2 * | 8/2020 | Razavi-Shirazi | C12P 7/16 | |
| 11,067,346 B2 * | 7/2021 | Creati | G01F 1/58 | |
| 11,505,474 B2 * | 11/2022 | Trujillo | C02F 1/008 | |
| 11,549,321 B2 * | 1/2023 | Larchar | E21B 21/065 | |
| 11,585,167 B2 * | 2/2023 | Hoskins | E21B 21/065 | |
| 11,760,671 B2 * | 9/2023 | Zheng | C02F 3/34 | 210/602 |
| 2002/0014464 A1 * | 2/2002 | Murphy, Jr. | C02F 1/505 | 210/764 |
| 2004/0222166 A1 * | 11/2004 | Van Vossen | C02F 1/688 | 210/764 |
| 2005/0011839 A1 * | 1/2005 | Dart | C02F 1/505 | 210/764 |
| 2005/0211627 A1 * | 9/2005 | Zahn | A01N 63/10 | 435/179 |
| 2007/0114186 A1 * | 5/2007 | Dart | C02F 5/02 | 210/749 |
| 2007/0119787 A1 * | 5/2007 | Dart | C02F 1/766 | 210/764 |
| 2007/0284316 A1 * | 12/2007 | Yamasaki | B82Y 30/00 | 210/177 |
| 2008/0197515 A1 * | 8/2008 | Facius | F28F 25/04 | 261/109 |
| 2011/0036785 A1 * | 2/2011 | Martin | E21B 21/065 | 210/173 |
| 2011/0198286 A1 * | 8/2011 | Niazi | F24F 7/06 | 210/660 |
| 2011/0232343 A1 * | 9/2011 | Mantelatto | C13B 10/12 | 71/11 |
| 2013/0056413 A1 * | 3/2013 | Miranzadeh | F28F 25/00 | 210/636 |
| 2013/0105416 A1 * | 5/2013 | Whitehead | B01D 29/35 | 210/348 |
| 2013/0134611 A1 * | 5/2013 | Colclasure | F28F 25/00 | 261/36.1 |
| 2013/0200012 A1 * | 8/2013 | Holmes | B01D 21/0012 | 210/323.1 |
| 2014/0175001 A1 * | 6/2014 | Willis, II | C02F 3/04 | 210/242.1 |
| 2014/0251881 A1 * | 9/2014 | Duesel, Jr. | C02F 1/048 | 366/291 |
| 2014/0284495 A1 * | 9/2014 | Medoff | E04B 1/92 | 250/454.11 |
| 2014/0342443 A1 * | 11/2014 | Bohn | C12M 39/00 | 435/292.1 |

(56) References Cited

U.S. PATENT DOCUMENTS

| | | | |
|---|---|---|---|
| 2015/0041401 A1* | 2/2015 | Williamson | B03C 1/0332 |
| | | | 210/695 |
| 2015/0279488 A1* | 10/2015 | Smith | G21C 17/00 |
| | | | 376/245 |
| 2015/0299583 A1* | 10/2015 | Kelsey | C10G 33/06 |
| | | | 210/799 |
| 2015/0367259 A1* | 12/2015 | Imler | E21B 21/065 |
| | | | 210/744 |
| 2016/0017444 A1* | 1/2016 | Medoff | C12P 19/02 |
| | | | 127/46.1 |
| 2016/0222476 A1* | 8/2016 | Medoff | C12M 47/00 |
| 2017/0009541 A1* | 1/2017 | Cox | B01D 19/0042 |
| 2017/0036145 A1* | 2/2017 | Duhon | B01D 35/147 |
| 2017/0043278 A1* | 2/2017 | Kelsey | C10G 33/06 |
| 2017/0080364 A1* | 3/2017 | Duhon | B01D 29/23 |
| 2017/0159077 A1* | 6/2017 | Medoff | C13K 13/002 |
| 2018/0215640 A1* | 8/2018 | Earman | C02F 9/00 |
| 2018/0223611 A1* | 8/2018 | Cox | E21B 21/02 |
| 2019/0023589 A1* | 1/2019 | Norman | C02F 1/465 |
| 2019/0277586 A1* | 9/2019 | Creati | G01F 1/58 |
| 2020/0025451 A1* | 1/2020 | Stone | H05K 7/20236 |
| 2020/0172409 A1* | 6/2020 | Trujillo | C02F 1/008 |
| 2020/0263512 A1* | 8/2020 | Hoskins | E21B 21/063 |
| 2020/0378200 A1* | 12/2020 | Krohn | B07B 1/24 |
| 2022/0371922 A1* | 11/2022 | Cioanta | B01D 65/02 |
| 2023/0194194 A1* | 6/2023 | Al Ghamdi | C02F 1/008 |
| | | | 210/698 |

OTHER PUBLICATIONS

Ridge, Irene et al., "Towards understanding the nature of algal inhibitors from barley straw", Management and Ecology of Freshwater Plants, pp. 301-305, 1996 (5 pages).

Butler, Bryan et al., "Barley Straw: A Potential Method of Algae Control in Ponds", Water Quality Workbook Series, Maryland Sea Grant Extension Program, University of Maryland College Park, Maryland, USA, 2001 (4 pages).

Guyer, J. Paul., "An Introduction to Cooling Tower Water Treatment", Continuing Education and Development, Inc., 2014 (73 pages).

Islami, H.R. et al., "Use of barley straw to control nuisance freshwater algae", Journal of American Water Works Association, pp. 111-118, 2011 (9 pages).

Office Action issued in corresponding Saudi Arabian Application No. 122440889, dated Apr. 24, 2024 (6 pages).

* cited by examiner

ECOLOGICAL SYSTEM FOR COOLING TOWERS ALGAE CONTROL

BACKGROUND

Water cooling towers are often used to extract waste heat from a system. Water cooling towers include a recirculating water system, where heat may be transferred to the circulating water and then ejected into the atmosphere primarily through evaporation. Components in a cooling tower system may include the cooling tower, one or more pumps to circulate water through the system, and a heat exchanger.

There are many configurations of cooling towers designed to maximize air and water contact and provide as much evaporation (and thus waste heat ejection) as possible. Generally, waste heat evaporation may be maximized by maximizing the surface area of the water as it flows through the cooling tower structure. An example of a cooling tower system 100 is shown in FIG. 1, including a cooling tower 110 and a pump 120. Heated water 130 may enter the top of the cooling tower 110 and be distributed across a cooling fill 112, which acts as a surface exchange. Additionally, cool air 140 may be circulated through the cooling tower 110 to contact and cool the heated water 130. Hot air and evaporation may exit the top of the cooling tower 110, while cooled water may be collected in a lower basin 114 of the cooling tower 110. The cooled water 132 may be pumped from the cooling tower 110 using the pump 120. The cooled water 132 may be reheated through a heat exchanger 150 to collect waste heat from another system, where the heated water 130 may then be recirculated to the cooling tower 110. Other variations of cooling tower systems are known, including closed loop and open loop systems for cooling heated water and releasing waste heat from the system.

As water circulates through and evaporates from a cooling tower, dissolved solids and contaminants may remain in the cooling tower, for example, collecting in the cooling tower lower basin 114. These contaminants may concentrate and increase the scaling, corrosion, fouling, and algae potential of the water. Accordingly, cooling tower systems typically use chemical treatment systems 160 to inject various types of chemicals used to prevent and treat different types of water contamination.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to systems that include a cooling tower, an algae inhibitor skid, and at least one pump fluidly connected between the cooling tower and the algae inhibitor skid. The algae inhibitor skid may include a first water tank containing a first water supply fluidly connected to the cooling tower and barley straw held within the first water tank and contacting the first water supply.

In another aspect, embodiments disclosed herein relate to assemblies that include an algae inhibitor system held on a skid, where the algae inhibitor system includes a first water tank having a porous carrier containing barley straw held across an internal dimension of the first water tank, a second water tank, a water outlet, a water inlet, a first outlet line fluidly connecting the first water tank to the water outlet, a first inlet line fluidly connecting the first water tank to the water inlet, a second outlet line fluidly connecting the second water tank to the water outlet, a second inlet line fluidly connecting the second water tank to the water inlet, a plurality of valves positioned along the first outlet line, the first inlet line, the second outlet line, and the second inlet line, and at least one pump fluidly connected to at least one of the first outlet line, the first inlet line, the second outlet line, and the second inlet line.

In yet another aspect, embodiments disclosed herein relate to methods for continuously inhibiting algae growth that include pumping, by a primary pump, water from a cooling tower into a water inlet on an algae inhibitor skid. The algae inhibitor skid may include a skid and a first water tank held on the skid, the first water tank containing barley straw suspended by a porous carrier within the first water tank. Methods may also include directing the water from the water inlet to the first water tank, injecting the water into the first water tank to contact the water with the porous carrier and barley straw, and pumping the water from the first water tank to the cooling tower.

Other aspects and advantages of the claimed subject matter will be apparent from the following description and the appended claims.

DETAILED DESCRIPTION

In one aspect, embodiments disclosed herein relate to systems and methods for preventing algae growth in cooling towers. Cooling towers may be used in combination with different heat generating systems to absorb waste heat with fluid circulating through the cooling tower. For example, cooling towers may be used in combination with oil and gas refineries or other types of processing refineries, where flowing water may be circulated through the refinery to absorb waste heat from one or more processes in the refinery. The heated water may then be directed through the cooling tower to cool the water for reuse. Heat may be transferred from a heat producing system (e.g., a refinery) to water being circulated to a cooling tower, for example, using separate heat exchanger devices or by flowing the water around one or more heat producing equipment in the system. For example, water may be flowed around an outer surface of heat producing equipment (e.g., in a jacket or adjacent piping) to absorb heat from the equipment, and the heated water may then be directed to a cooling tower to eject the absorbed heat.

Algae inhibitor systems are described herein that may be fluidly connected with a cooling tower to prevent algae growth in the cooling tower. According to embodiments of the present disclosure, algae inhibitor systems may include a volume of barley straw that is held within a flow path of water being circulated to a cooling tower. As water is flowed through the barley straw, the water may decompose or breakdown the barley straw. Such decomposition of barley straw may naturally produce algae inhibitor compounds (e.g., compounds derived from oxidized lignin or humic compounds), which may then be used to prevent the growth of algae in the water circulating through a cooling tower. Using barley straw in algae inhibitor systems disclosed herein may provide a more cost effective and environmentally friendly way to prevent algae growth in water cooling systems when compared with the conventional approach of utilizing artificial chemicals.

Figure 1:
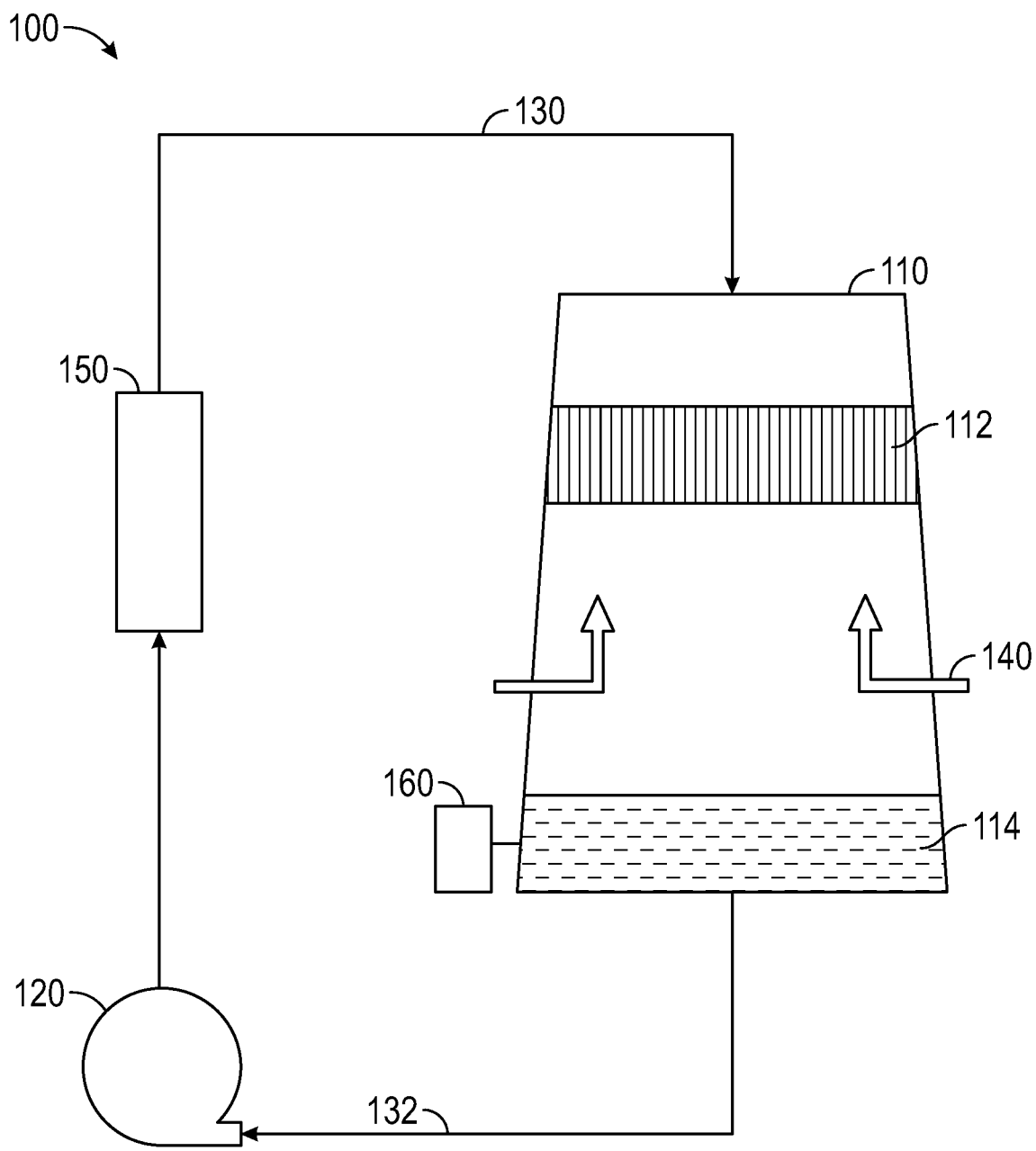
FIG. 1 shows a conventional cooling tower system.
Figure 2:
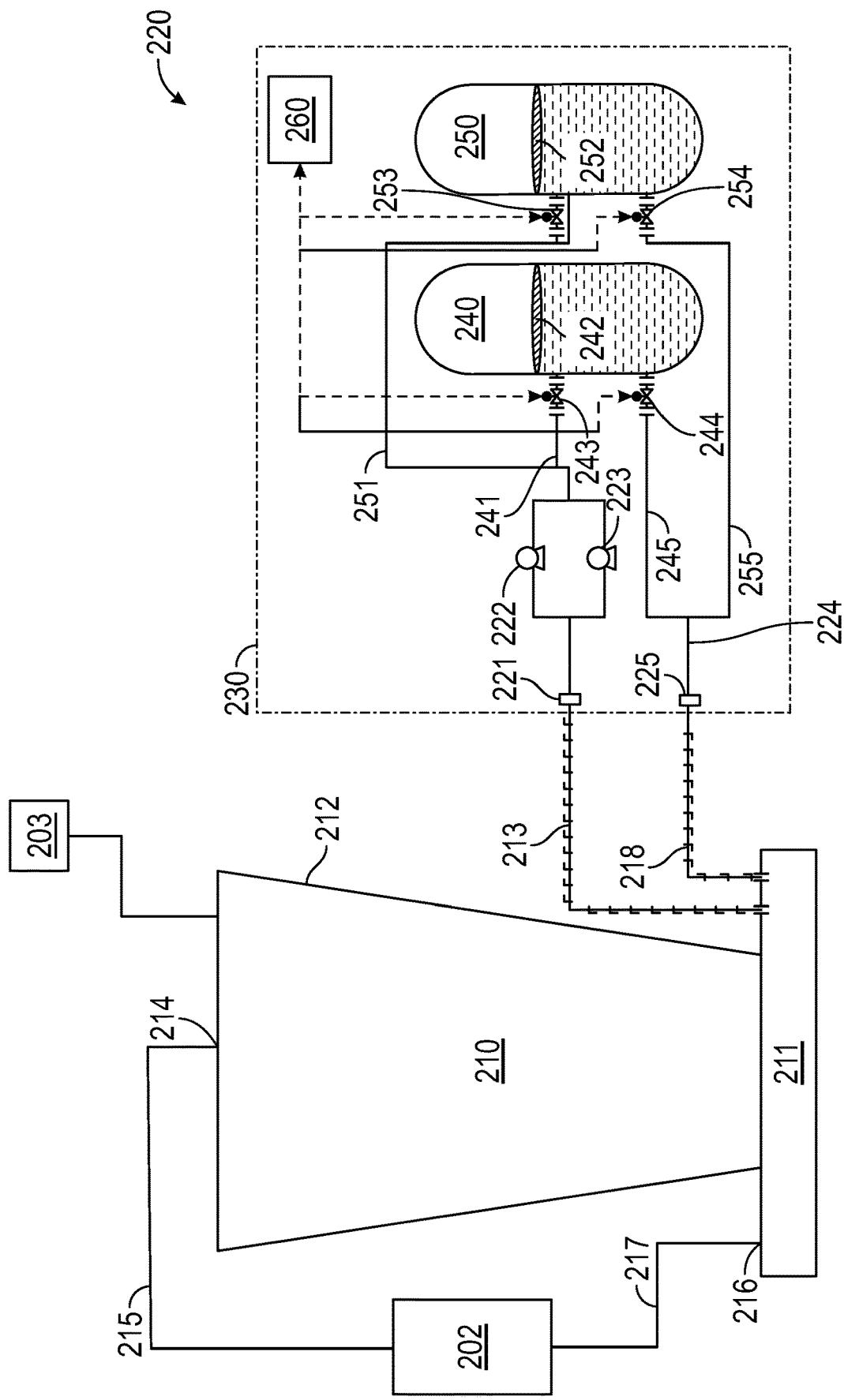
FIG. 2 shows a system according to embodiments of the present disclosure.

FIG. 2 shows an example of a system 200 according to embodiments of the present disclosure utilizing an algae inhibitor system 220 with barley straw to prevent algae growth in a cooling tower 210.

As described herein, a cooling tower 210 may be used to discard waste heat generated by a processing system 202, such as an oil and gas refinery. Generally, a cooling tower may include an outer wall structure 212, which may house one or more water and air flow channels, a heated water inlet 214 (e.g., which may be fitted with one or more spray nozzles for spraying the water into the cooling tower), and a cooled water outlet 216 (where cooled water may be discharged from the cooling tower). Different configurations of a cooling tower 210 may be used to cool heated water 215 as it flows through the cooling tower. For example, a cooling tower may include a natural draft cooling tower (where air may flow around circulating water through the cooling tower without using mechanical means to force the air flow), an induced draft cooling tower or a forced draft cooling tower (where air flow may be induced or forced through the cooling tower using mechanical means such as fans), or other type of cooling tower.

After the heated water 215 enters the cooling tower 210 through the heated water inlet 214, the heated water 215 may be mixed with air and cooled inside the cooling tower 210. The cooled water may be collected in a lower basin 211 of the cooling tower 210 (or the cooled water may be directly discharged from the cooling tower without being collected in an area of the cooling tower). Cooled water 217 from the cooling tower 210 may be discharged from the cooled water outlet 216 to be recirculated back to the processing system 202 to absorb more heat.

As heated water is directed through the cooling tower, water may be lost from the system through evaporation. Water lost by the cooling process may be replaced from a replacement water source 203 (e.g., a water tanker fluidly connected to the cooling tower).

According to embodiments of the present disclosure, an algae inhibitor system 220 having barley straw 242, 252 positioned within a water flow path may be fluidly connected to the cooling tower 210. In some embodiments, cooled water 217 from the cooling tower 210 may be directed to the algae inhibitor system 220 prior to being recirculated back to the processing system 202 (e.g., through a series of connected flowlines). In some embodiments, the algae inhibitor system 220 may be fluidly connected to the lower basin 211 of the cooling tower 210 (where cooled water may be collected in the cooling tower), and cooled water from the cooling tower 210 may be continuously circulated to the algae inhibitor system 220 while some of the cooled water 217 is recirculated back to the processing system 202.

The algae inhibitor system 220 may be fluidly connected to the cooling tower 210 by a treatment inlet line 213, which may include one or more valves or flow control devices for controlling the flow of water from the cooling tower 210 to the algae inhibitor system 220. Water from the cooling tower 210 may be flowed through the treatment inlet line 213 to a water inlet 221 of the algae inhibitor system 220. According to embodiments of the present disclosure, the algae inhibitor system 220 may have a single water inlet 221, where water may be directed through different flowlines to flow to different water tanks 240, 250 after entering the single water inlet 221. In some embodiments, an algae inhibitor system may include multiple water inlets, for example, to allow connection to multiple cooling towers. In some embodiments, separate flowlines may be used to connect different water tanks 240, 250 in the algae inhibitor system 220 directly to the cooling tower 210 (without flowing water through a shared treatment inlet line). The water inlet 221 may be connected to a treatment inlet line 213 using a standardized connection fitting (e.g., a clamp connection or a threaded connection).

Water may be pumped from the water inlet 221 to at least one water tank 240, 250 using at least one pump. For example, a primary pump 222 and a standby pump 223 may be fluidly connected in parallel along an inlet line fluidly connecting the water inlet 221 to the water tanks. The standby pump 223 may act as a backup pump to the primary pump 222 for when the primary pump 222 is down. to pump water from the water inlet 221 to the water tank(s). While the pumps 222, 223 are shown in FIG. 2 as being positioned along inlet lines between the water tanks 240, 250 and the water inlet 221, other embodiments may utilize pumps in other locations to pump water through the algae inhibitor system 220. For example, in some embodiments, one or more pumps may be fluidly connected along other flowlines in the algae inhibitor system 220 or along flowlines connecting the algae inhibitor system 220 to the cooling tower 210.

When the algae inhibitor system 220 is connected to the cooling tower 210, water from the cooling tower 210 (e.g., cooled water collected in a lower basin 211 of the cooling tower 210) may be directed to the algae inhibitor system 220 and flowed through barley straw in the algae inhibitor system 220. As water contacts and soaks the barley straw (e.g., 242 or 252) in the algae inhibitor system 220, algae inhibitor compounds naturally forming from the decomposition of the barley straw in water may be collected by the water and circulated back to the cooling tower 210 to prevent algae growth in the cooling tower 210.

Algae inhibitor systems 220 according to embodiments of the present disclosure may generally include at least one water tank (e.g., 240, 250), barley straw (e.g., 242, 252) held in one or more water tanks, and a series of connected flowlines and valves used to selectively flow water from the cooling tower 210 to a water tank. According to embodiments of the present disclosure, a water tank 240, 250 may be a container capable of holding an amount of water and having both a tank inlet and a tank outlet, such that a flow path may be formed through the container between the tank inlet and the tank outlet. The size of a water tank 240, 250 may be selected based on, for example, the amount of water that is to be treated (e.g., the amount of water being flowed from a cooling tower to the water tank), the number of additional water tanks being used in the algae inhibitor system 220 to treat water from a cooling tower, the size of the treatment location (the amount of room around the cooling tower), and when the algae inhibitor system is assembled to a skid 230 (discussed more below), the size of the skid 230.

Barley straw may be held inside of the water tank 240, 250 using a porous carrier, such as a net, a fabric bag, a flexible material having a plurality of holes small enough to allow flowing water to pass through without barley straw passing through (i.e., to strain the barley straw from the passing water), or a rigid structure having a plurality of holes to strain the barley straw from the passing water. A porous carrier containing barley straw 242, 252 may be connected inside the water tank 240, 250, such that the porous carrier and barley straw contacts water flowing along the flow path formed between the tank inlet and the tank outlet. In such manner, water flowing through the water tank 240, 250 may contact and soak the barley straw 242, 252.

The quantity of barley straw used to provide a sufficient amount of naturally produced algae growth inhibitor compounds to treat a cooling tower may depend on the surface area of the water being treated, e.g., the amount of water in the water tank and the size of the water tank in which the barley straw will be placed. The water tank surface area may, in turn, be designed to have a size proportional to how much water is needed in the cooling tower. Thus, the amount of barley straw used may be calculated based on the water-contacting surface area being treated.

Figure 5:
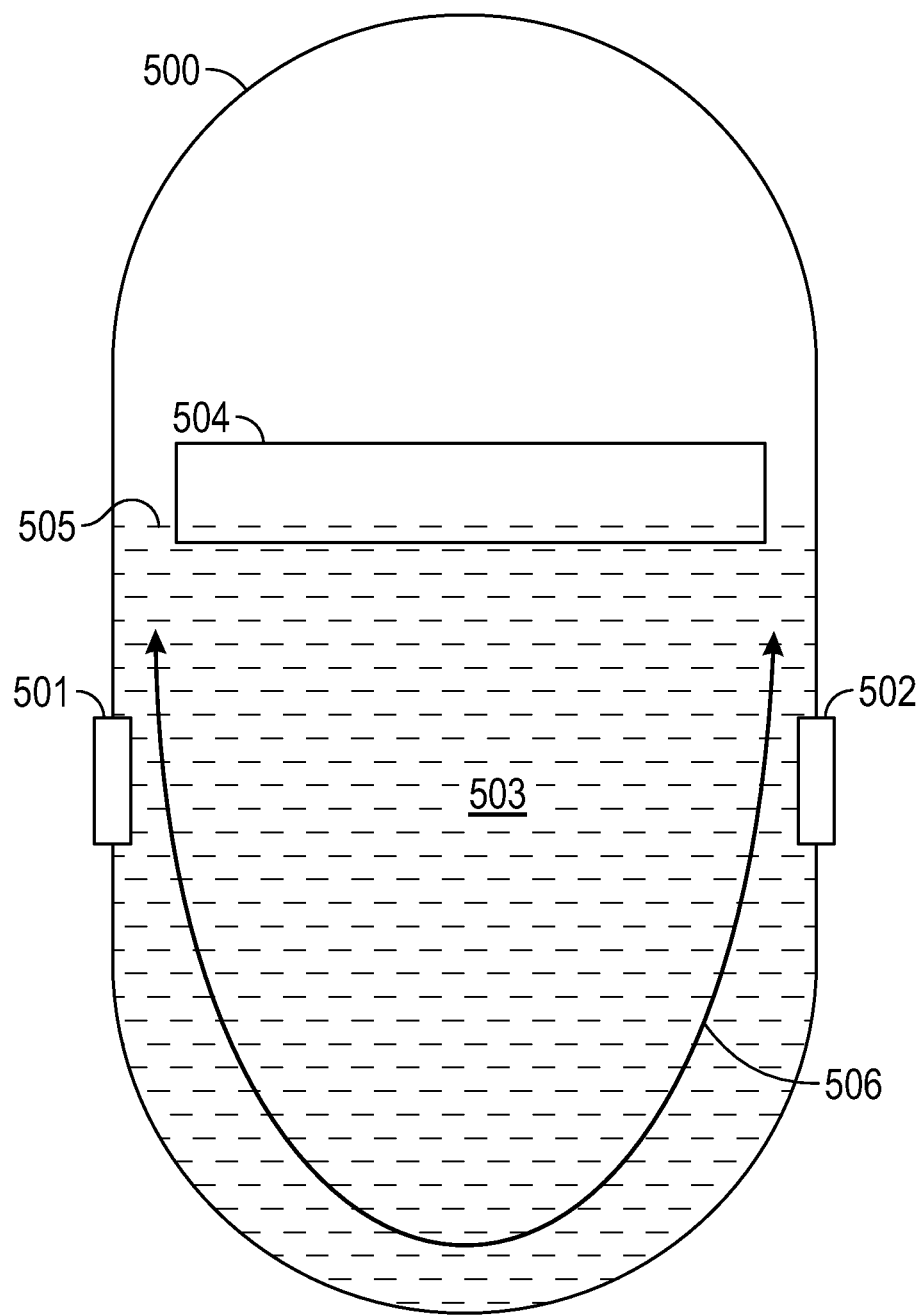
FIG. 5 shows an example of water tank according to embodiments of the present disclosure.

For example, FIG. 5 shows an example of a water tank 500 having a tank inlet 501 and a tank outlet 502. The water tank 500 may be designed to contain an amount of water 503, and a porous carrier 504 containing barley straw may be designed to be held at the water line 505. The tank-contacting surface area 506 of the water 503 may be used to select the amount of barley straw held in the porous carrier 504. In some embodiments, the amount of barley straw selected to be held in the water tank 500 may range between 100 to 300 pounds for each acre of the tank-contacting surface area 506 of the water in the water tank 500 in which the barley straw is held. In some embodiments, the amount of barley straw used to treat a water tank may be selected based on the total interior surface area of the water tank, where the amount of barley straw contained may range between 100 to 300 pounds per acre of total interior surface area of the water tank. For example, a circular tank having a total interior surface area of about 0.02 acres may have an amount of barley straw ranging from 2 to 6 pounds held in the water tank for treating water in the water tank. In some embodiments, multiple water tanks containing barley straw may be fluidly connected to a single cooling tower, where a total amount of barley straw in the multiple water tanks may be designed to range between 100 to 300 pounds per acre of total surface area in the multiple water tanks.

As water is flowed through barley straw in the algae inhibitor system 220, the barley straw decomposes. After an amount of time passes, or after an amount of barley straw decomposes, water flow may be stopped to the water tank holding the decomposed barley straw to remove what is left of the decomposed barley straw and provide new barley straw in the water tank.

For example, in the system shown in FIG. 2, two water tanks, including a first water tank 240 and a second water tank 250 may be fluidly connected to the cooling tower 210 via a plurality of flowlines (e.g., inlet lines 241, 251 and a treatment inlet line 213 fluidly connecting the cooling tower 210 to the algae inhibitor system 220). In other embodiments, one or more than two water tanks may be used in an algae inhibitor system. In algae inhibitor systems having one water tank, water flow to the single water tank may be stopped and started (e.g., using one or more valves positioned along flowlines to and from the water tank) to replace barley straw within the water tank and then continue barley straw water treatment. However, by using two or more water tanks fluidly connected to the cooling tower 210, water flow from the cooling tower 210 may be alternated to different water tanks to allow for barley straw to be replaced in shut-off water tank(s). In such manner, continuous water treatment may be provided by at least one water tank containing barley straw, while another water tank is down (e.g., to replace barley straw therein, maintenance, or other down time).

Water flow may be alternated to different water tanks (e.g., 240, 250) by selectively operating valves along the flowlines to and from the water tanks to stop and start water flow to the different water tanks. Valves may be selectively opened and closed, either manually or automatically, to switch water flow to different water tanks.

In some embodiments, a programmable logic controller (PLC) 260 may be in communication with valves in the algae inhibitor system 220 (e.g., at least one inlet valve 243, 253 and at least one outlet valve 244, 254 to the first water tank 240 and the second water tank 250) to operate the valves and thus control fluid flow to and from the water tanks 240, 250. The PLC 260 may include memory storing input data and control programs, an input and output interface, a communications interface to receive and transmit data on communication networks from/to remote PLCs (e.g., in valves), a power supply, and a processor, which may interpret inputs, execute the control programs, and send output signals. According to embodiments of the present disclosure, a PLC 260 may be programmed to automatically switch water flow to different water tanks. For example, in the embodiment shown in FIG. 2, the PLC 260 may be programmed to open and close a plurality of valves 243, 253, 244, 254 controlling fluid flow to and from the first water tank 240 and the second water tank 250 to alternate flowing water from the cooling tower 210 to the first water tank 240 and from the cooling tower 210 to the second water tank 250.

After water is flowed through barley straw 242, 252 in one or more water tanks 240, 250, the treated water may exit the water tank 240, 250 through a tank exit and flow through at least one outlet line 245, 255, 224 to a water outlet 225. In the embodiment shown, a first outlet valve 244 may be positioned along a first outlet line 245 from the first water tank 240 to control the flow of water exiting the first water tank 240, and a second outlet valve 254 may be positioned along a second outlet line 255 from the second water tank 250 to control the flow of water exiting the second water tank 250. The first and second outlet lines 245, 255 may be fluidly connected to the water outlet 225 via a shared outlet line 224, or outlet lines from different tanks may have separate system water outlets. A algae inhibitor system water outlet 225 may be fluidly connected to the cooling tower 210 via a treatment outlet line 218. In the embodiment shown, a single treatment outlet line 218 fluidly connects a single water outlet 225 to a single cooling tower 210. In other embodiments, multiple treatment outlet lines and/or multiple water outlets may be used to fluidly connect one or more water tanks in an algae inhibitor system to one or more cooling towers. The water outlet 225 may be connected to the treatment outlet line 218 via a standardized connection fitting (e.g., a clamp connection or a threaded connection).

According to embodiments of the present disclosure, an algae inhibitor system 220 may be provided on a skid 230, where the algae inhibitor system 220 and skid 230 assembly may be referred to herein as an algae inhibitor skid. By providing an algae inhibitor system according to embodiments of the present disclosure on a skid 230, the algae inhibitor system may be movable and more easily connected to a cooling tower 210 to treat the water flowing through the cooling tower 210. Different configurations of an algae inhibitor system may be provided on a skid for use with different cooling tower systems.

Figure 3:
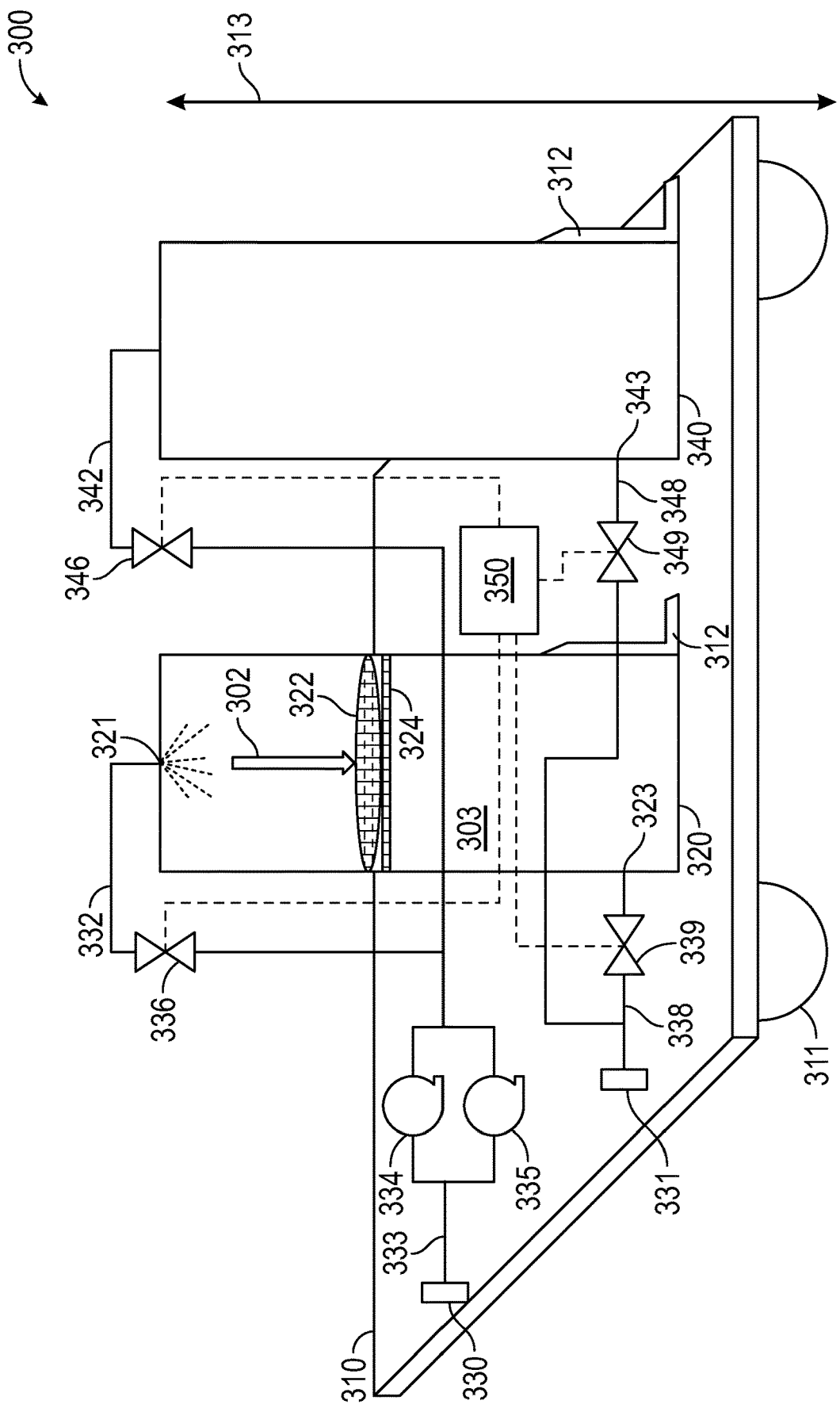
FIG. 3 shows an algae inhibitor skid according to embodiments of the present disclosure.

For example, FIG. 3 shows an example of an algae inhibitor skid 300 according to embodiments of the present disclosure having an algae inhibitor system provided on a skid 310. The skid 310 may include a base, which may support the equipment of the algae inhibitor system. The base of the skid 310 may be supported by a plurality of legs or wheels 311 such that the base may be spaced from the ground, or the base may be provided directly on the ground without legs or wheels. In some embodiments, the skid 310 may further include one or more support structures 312 (e.g., arms, brackets, tank stands, etc.) extending from the opposite side of the base from the wheels 311, where the support structures 312 may be used to connect or support equipment in the algae inhibitor system to the base of the skid 310.

An algae inhibitor skid may be designed to be transportable, e.g., as a trailer having wheels or as a unit that may be mounted on a trailer. In some embodiments, an algae inhibitor skid 300 may be designed to have dimensions that are compliant with standard semi-trailer dimensions set by the governing body in which the algae inhibitor skid is being used. For example, an algae inhibitor skid may have a length ranging from about 48 to 53 feet, a width of about 8.5 feet or less, and a height 313 of about 13.5 feet or less.

The algae inhibitor system may include a first water tank 320 held on the skid 310. The first water tank 320 may have a porous carrier 322 containing barley straw held across an internal dimension of the first water tank 320. The porous carrier 322 (e.g., a net) may be held within the first water tank 320 in different ways to have the porous carrier 322 (and barley straw) contact the water 303 in the first water tank 320. For example, the porous carrier 322 containing barley straw may be connected within the first water tank 320 to traverse a flow path between a first tank inlet 321 and a first tank outlet 323, such that water 302 may flow from the first tank inlet 321 through the porous carrier 322 and barley straw to the first tank outlet 323. In some embodiments, the first water tank 320 may have a tank inlet 321 located at a top side of the first water tank, above the barley straw. At least one water distribution nozzle may be fluidly connected to or provided at the first tank inlet 321, which may be used to spray incoming water into the first water tank 320 over the barley straw.

In other embodiments, such as shown in FIG. 5, water 503 may be pumped into a tank inlet 501 to fill water 503 into the water tank 500, such that the tank inlet 501 and a tank outlet 502 may be positioned below the water line 505 of the water 503. In such embodiments, an amount of water 503 may be filled in the tank 500 and a porous carrier 504 containing barley straw may be held in the tank 500 such that the barley straw contacts the water 503.

Referring again to FIG. 3, according to embodiments of the present disclosure, after water 302 enters the first water tank 320 and flows through the porous carrier 322 and barley straw, the water 302 may be collected in the first water tank 320 to act as a first water supply 303, which may eventually be directed to a cooling tower. The porous carrier 322 may be held within the first water tank 320 at a location to contact the anticipated water line of the first water supply 303 collected in the first water tank 320. In some embodiments, the flow rate of water 302 entering and exiting the first water tank 320 may be controlled to keep the water line of the first water supply 303 collected in the first water tank 320 at or above the porous carrier 322, such that barley straw within the porous carrier 322 is in continuous contact with the first water supply 303.

In some embodiments, the porous carrier 322 may be releasably connected via at least two connection points to an internal wall of the first water tank 320, for example, using hooks, brackets, or other connection mechanism. In some embodiments, a porous carrier 322 containing barley straw may be floated along the water line of water in the first water tank 320 (e.g., using buoyant material to form the porous carrier). In some embodiments, a strainer 324 may be held within the first water tank 320 between the barley straw and the first water supply 303. The strainer 324 may be fixedly connected inside the first water tank 320 (e.g., by welding) or may be removably connected inside the first water tank 320. The strainer 324 may be a rigid piece of material having multiple holes formed through the strainer 324, which may allow water to pass through and prevent barley straw from passing through. The strainer 324 may be positioned within the first water tank 320 at or below the anticipated water line of the first water supply 303, e.g., between the anticipated water line and 5 inches or more below the anticipated water line.

In some embodiments, a porous carrier 322 containing barley straw may be held on a strainer 324 (e.g., by laying the porous carrier 322 on the strainer 324) in the first water tank 320. By using a porous carrier 322 to hold barley straw in combination with a strainer 324, the porous carrier 322 may be used to easily remove and replace the barley straw after decomposition while the strainer 324 may be used to catch any barley straw that escapes from the porous carrier 322. For example, a porous carrier 322 may be a bag holding barley straw, where the bag of barley straw may be placed on the strainer 324 to treat the water 303 and then replaced with a new bag of barley straw after the previous bag of barley straw was used and decayed to treat the water 303. In some embodiments, the filter size of the strainer 324 may be smaller than the filter size of the porous carrier 322, such that the strainer 324 may be used to catch smaller pieces of barley straw (e.g., pieces of partially decomposed barley straw) that fall through the porous carrier 322. In some embodiments, a first water tank 320 may be provided with a porous carrier 322 holding barley straw without a strainer 324. In some embodiments, a first water tank may have barley straw held by a strainer 324 without the use of a porous carrier 322.

The algae inhibitor system may also include a water inlet 330 and a water outlet 331 provided on the skid 330 and fluidly connected to the first water tank 320. The water inlet 330 and water outlet 331 may be provided for connecting the algae inhibitor system to one or more cooling towers to treat water in the cooling tower(s). The water inlet 330 may be fluidly connected to the first tank inlet 321 via at least one flowline, e.g., a first inlet line 332 and a pump line 333. At least one pump (e.g., a primary pump 334 and a standby pump 335) may be provided along the pump line 333 to pump water from the water inlet 330 to the first tank inlet 321. Additionally, at least one valve 336 or other flow control device may be provided along a flowline between the water inlet 330 and the first tank inlet 321 to control fluid flow to the first water tank 320.

The water outlet 331 may be fluidly connected to the first tank outlet 323 via at least one flowline, e.g., a first outlet line 338. Additionally, at least one valve 339 or other flow control device may be provided along a flowline between the water outlet 331 and the first tank outlet 323 to control fluid flow from the first water tank 320 to the water outlet 331. Pumping pressure from an inlet line may be used to move water through the entire algae inhibitor system, or a pump may be provided along an outlet line (e.g., 338).

According to embodiments of the present disclosure, a method for continuously inhibiting algae growth in a water system may include pumping water 302, by the primary pump 334, from the water inlet 330 on the algae inhibitor skid 300 to the first water tank 320. The water 302 may be injected into the first water tank 320 to contact the porous carrier 322 containing barley straw. In some embodiments, the water 302 may be injected above the porous carrier 322 to fall through the porous carrier 322 and barley straw contained therein via gravity, where the water may be collected in a lower portion of the first water tank 320 to be used as a first water supply 303 of barley straw-treated water. In some embodiments, the water 302 may be injected into the first water tank 320 from below an anticipated water line (e.g., from the lower portion of the first water tank 320) in an amount to keep the water line in contact with the barley straw in the porous carrier 322. Treated water from the first water supply 303 may then be pumped from the first water tank 320 to exit the water outlet 331 and to be used in a cooling tower.

Algae inhibitor skids 300 according to embodiments of the present disclosure may also include a second water tank 340 held on the skid 310. For example, the second water tank 340 may be held on the skid 310 using one or more brackets or a tank stand. At least one flowline, e.g., including second inlet line 342 and pump line 333, may fluidly connect a second tank inlet 341 of the second water tank 340 to the water inlet 330. Additionally, at least one valve 346 or other flow control device may be provided along a flowline between the water inlet 330 and the second tank inlet 341 to control fluid flow to the second water tank 340.

A second outlet line 348 may fluidly connect a second tank outlet 343 of the second water tank 340 to the water outlet 331. At least one valve 349 or other flow control device may be provided along a flowline between the water outlet 331 and the second tank outlet 343 to control fluid flow exiting the second water tank 340.

In some embodiments, the algae inhibitor skid 300 may also have a PLC 350 in communication with one or more valves in the algae inhibitor system. The PLC 350 may be programmed to operate the valve(s) to control the flow of water to and from the first water tank 320 and the second water tank 340.

While an example configuration for fluidly connecting the first water tank 320 and the second water tank 340 to a system inlet and outlet is shown in FIG. 3, algae inhibitor skid 300 configurations are not so limited. For example, a plurality of valves for controlling fluid flow to and from the first water tank 320 and the second water tank 340 may be positioned in other locations along the first outlet line 338, the first inlet line 332, the second outlet line 348, and the second inlet line 342. Additionally, at least one pump may be fluidly connected to at least one of the first outlet line 338, the first inlet line 332, the second outlet line 348, and the second inlet line 342 in a different arrangement than shown in FIG. 3.

Further, the water inlet 330 and water outlet 331 are shown in FIG. 3 as being on the same side of the skid 310. The water inlet 330 may act as the sole inlet to the entire algae inhibitor system held on the skid 310, and the water outlet 331 may act as the sole outlet to the entire algae inhibitor system held on the skid 310. By providing the water inlet 330 and the water outlet 331 on the same side of the skid 310, a simplified connection and set-up of the algae inhibitor skid 300 to a cooling tower may be provided. However, in some embodiments, a water inlet 330 and water outlet 331 may be mounted on different sides of a skid. In some embodiments, more than one water inlet and/or more than one water outlet may be provided on a skid. In such embodiments, multiple water inlets and/or multiple water outlets may be used to connect the algae inhibitor skid to more than one cooling tower.

Additionally, by providing two or more water tanks (e.g., first water tank 320, second water tank 340, and optionally, additional water tanks) in an algae inhibitor system according to embodiments of the present disclosure, water may be continuously treated by the algae inhibitor system, even when one of the water tanks is down (e.g., to replace barley straw in the water tank, for maintenance, or for down-time).

For example, methods according to embodiments of the present disclosure for continuously inhibiting algae growth may include continuously pumping water from a cooling tower to at least one water tank containing barley straw in an algae inhibitor skid to treat the water circulating between the cooling tower and the barley-containing water tank. The water circulation path between the cooling tower and algae inhibitor skid may be alternated to switch the water flow to different barley-containing water tanks, such that barley may be replaced in one or more water tanks while maintaining continuous water circulation and treatment between the cooling tower and algae inhibitor skid.

Figure 4:
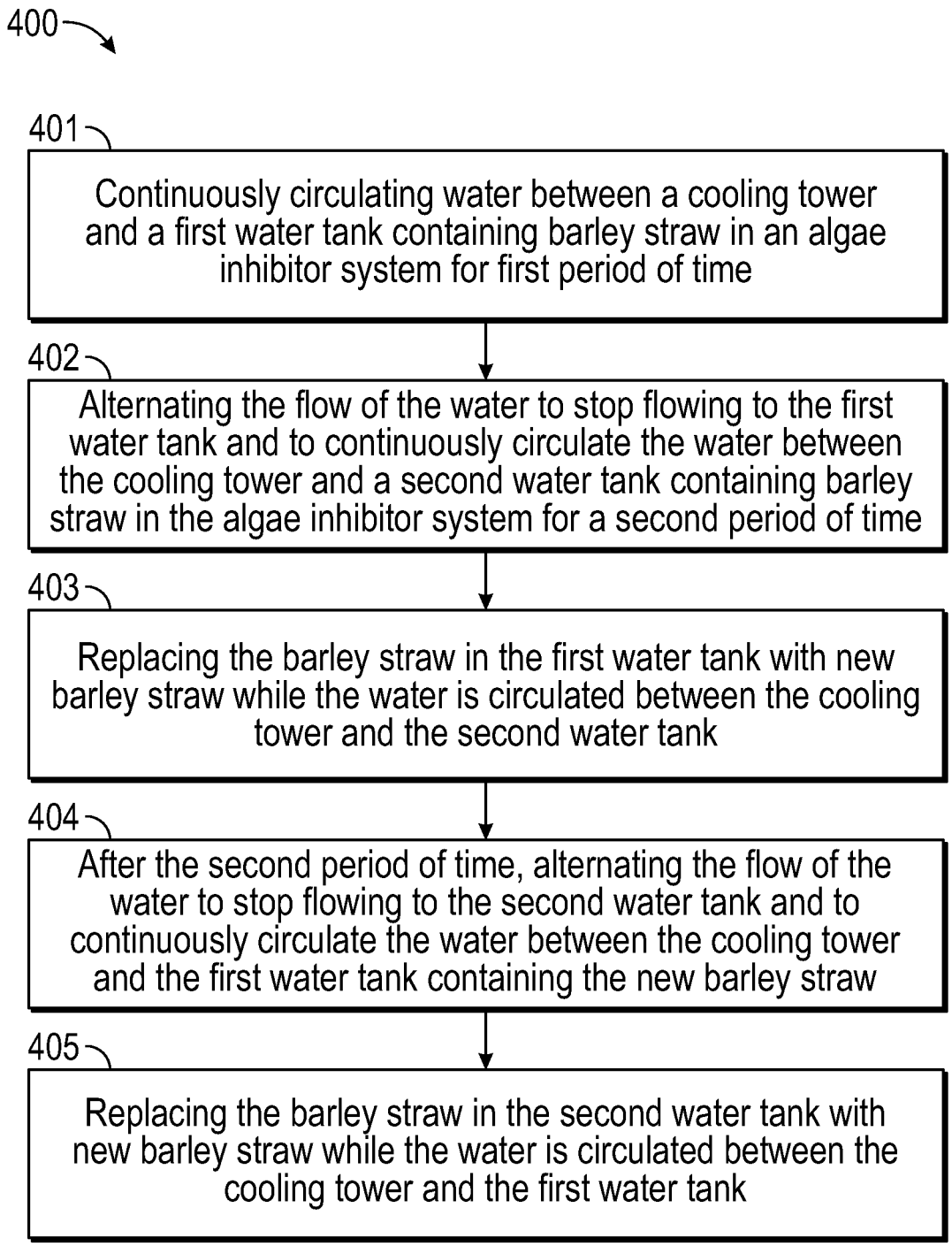
FIG. 4 shows a method according to embodiments of the present disclosure.

FIG. 4 shows an example of a method 400 according to embodiments of the present disclosure for continuously inhibiting algae growth in a cooling tower. Certain steps in the method 400 of FIG. 4 may be performed in a different order than shown or may be performed simultaneous. Additionally, certain steps in the method 400 of FIG. 4 may be omitted or repeated.

As shown in step 401 of the method 400, water may be continuously circulated between a cooling tower and a first water tank containing barley straw in an algae inhibitor system according to embodiments of the present disclosure. For example, water may be pumped from a cooling tower, through a water inlet on an algae inhibitor skid, and to a first water tank held on the skid, where the first water tank contains barley straw held by a porous carrier within the first water tank. The water may be injected into the first water tank and flowed around the porous carrier and barley straw to treat the water. The treated water may be collected in a portion of the first water tank as a first water supply. Treated water from the first water supply may be pumped from the first water tank back to the cooling tower. In such manner, water may be continuously circulated between a cooling tower and a first water tank in an algae inhibitor skid to be continuously treated with barley straw.

Water may be continuously circulated between a cooling tower and a first water tank containing barley straw for a first period of time, which may be a preselected amount of time, or may be based on performance of the treatment system. For example, the barley straw in the first water tank may be monitored to determine an amount of decomposition in the barley straw as water is flowed around it, e.g., by monitoring an amount of naturally produced algae growth inhibitor compounds from the barley straw, where a decrease in the amount of naturally produced algae growth inhibitor compounds may indicate decomposition of the barley straw. When the barley straw has a certain amount of decomposition (or when a decrease in naturally produced algae growth inhibitor compounds is detected), the first period of time for circulating water through the first water tank may be ended.

Generally, it has been observed that barley straw decays upon constant contact with water for about 6 months. Thus, according to some embodiments, water may be continuously circulated between a cooling tower and a first water tank containing barley straw for a first period of time of 6 months. In some embodiments, water may be continuously circulated between a cooling tower and a first water tank containing barley straw for a first period of time ranging from a lower limit selected from 1 month, 2 months, or 3 months to an upper limit of 6 months, 7 months, or 9 months.

As shown in step 402, after the first period of time of circulating water between the cooling tower and the first water tank, the flow of water to the first water tank may be stopped, and water may be continuously circulated between the cooling tower and a second water tank containing barley straw in the algae inhibitor system for a second period of time.

For example, new barley straw may be added into a porous carrier held with the second water tank. After the first period of time (e.g., when the barley straw in the first water tank has decayed), water flow to the first tank may be stopped, and the water may be redirected from the cooling tower to the second water tank. While water is continuously circulating between the cooling tower and the second water tank, the barley straw from the first water tank may be removed and replaced with new barley straw, as shown in step 403. As shown in step 404, after circulating the water between the cooling tower and the second water tank for the second period of time, the flow of water to the second water tank may be stopped, and water may be continuously circulated between the cooling tower and the first water tank containing new barley straw. While water is continuously circulating between the cooling tower and the first water tank, the barley straw from the second water tank may be removed and replaced with new barley straw, as shown in step 405.

In such manner, methods for continuously inhibiting algae growth may include alternating flowing water to a first water tank to be treated to flowing the water to a second water tank to be treated, where new barley straw may be added to the first water tank or the second water tank while the water is flowing to the other of the first water tank or the second water tank. In some embodiments, water circulation may be altered between more than two water tanks (e.g., three or more water tanks), depending on the size and amount of cooling towers being serviced.

According to embodiments of the present disclosure, water circulation from a cooling tower to different water tanks containing barley straw may be altered by automatically or manually switching operations of valves along the inlet and outlet flowlines to the different water tanks. For example, in some embodiments, a PLC may be used to open and close a plurality of valves controlling fluid flow to and from the different water tanks.

For example, in an algae inhibitor system having a first water tank and a second water tank fluidly connected to a cooling tower, a PLC may be used to open a second inlet valve to the second water tank and close a first inlet valve to the first water tank in order to alternate the flow of water from flowing to the first water tank to flowing to the second water tank (e.g., to switch out the barley straw in the first water tank). Similarly, the PLC may be used to open the first inlet valve to the first water tank and close the second inlet valve to the second water tank in order to alternate the flow of water from flowing to the second water tank to flowing to the first water tank (e.g., to switch out the barley straw in the second water tank).

A PLC may also be used to open and close outlet valves positioned along outlet flowlines from different water tanks when alternating the flow of water to the different water tanks. For example, a method of alternating water flow from a first water tank containing decomposed barley straw to a second water tank containing new barley straw may include using a PLC to close a first inlet valve positioned along a first inlet line to the first water tank, open a second inlet valve positioned along a second inlet line to the second water tank, close a first outlet valve fluidly connected to a first outlet of the first water tank, and open a second outlet valve fluidly connected to a second outlet of the second water tank. The PLC may open and close the inlet and outlet valves simultaneously, sequentially to first close circulation through the first water tank and then open circulation through the second water tank, or sequentially to first open circulation through the second water tank and then close circulation through the first water tank.

According to embodiments of the present disclosure, a PLC may be programmed to alternate the flow of the water between different water tanks every 6 months (or other period of time) to automate the continuous circulation and treatment of water being flowed to a cooling tower while decomposed barley straw in one water tank is replaced with new barley straw. The PLC may also be programmed to allow human intervention if the schedule for water tank alternation is to be interrupted or changed.

Systems and methods described herein provide an improved way to prevent algae growth in cooling towers. For example, systems described herein may provide enough algae inhibitors naturally produced from barley straw to prevent algae growth in a cooling tower while also being able to fit within a skid. By providing algae inhibitor systems as a skid assembly, algae inhibitor systems according to embodiments of the present disclosure may be easily connected with different cooling tower systems and transported between different locations.

Additionally, by using barley straw systems described herein to prevent algae growth in cooling towers, the need for artificial chemicals (which are more expensive when compared to barley straw) may be eliminated, such that no artificial chemicals for preventing algae growth may be added to a cooling tower system. Thus, using methods and systems according to embodiments of the present disclosure may reduce the costs for algae control in cooling towers.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A recirculating cooling tower water algae control system comprising:
    a cooling tower;
    an algae inhibitor skid system including:
        a skid;
        a first water tank containing a first water supply;
        a quantity of barley straw secured within the first water tank within a flow path of water being recirculated to the cooling tower;
    a treatment inlet line fluidly connecting the algae inhibitor skid system to the cooling tower;
    a treatment outlet line fluidly connecting the algae inhibitor skid system to the cooling tower; and
    at least one pump fluidly connected between the cooling tower and the first water tank;
    wherein, water pumped from the cooling tower is circulated through the first water tank where it contacts the barley straw and then back to the cooling tower.

2. The recirculating cooling tower water algae control system of claim 1, wherein the at least one pump is provided on the skid and comprises:
a primary pump; and
a standby pump fluidly connected in parallel with the primary pump.

3. The recirculating cooling tower water algae control system of claim 1, further comprising a second water tank mounted on the skid and fluidly connected to the cooling tower.

4. The recirculating cooling tower water algae control system of claim 3, further comprising a programmable logic controller in operable controlling communication with at least one inlet valve and at least one outlet valve to the first water tank and the second water tank.

5. The recirculating cooling tower water algae control system of claim 4, wherein the programmable logic controller is programmed to automatically switch water flow between the first water tank and the cooling tower to between the second water tank and the cooling tower every six months.

6. The recirculating cooling tower water algae control system of claim 1, wherein the barley straw is secured in the first water tank atop a strainer.

7. The recirculating cooling tower water algae control system of claim 1, wherein the barley straw is held in a porous carrier, and wherein the porous carrier is connected inside the first water tank.

8. The recirculating cooling tower water algae control system of claim 1, wherein the first water tank comprises a tank inlet located at a top side of the first water tank, and wherein at least one water distribution nozzle is provided at the tank inlet.

* * * * *